United States Patent [19]

Tokoro et al.

[11] Patent Number: 5,459,169

[45] Date of Patent: Oct. 17, 1995

[54] UNCROSSLINKED POLYETHYLENE PARTICLES FOR THE PRODUCTION OF EXPANDED PARTICLES AND UNCROSSLINKED POLYETHYLENE EXPANDED PARTICLES

[75] Inventors: Hisao Tokoro, Tochigi; Kazuo Tsurugai, Utsunomiya; Hidehiro Sasaki, Utsunomiya; Masaharu Oikawa, Utsunomiya, all of Japan

[73] Assignee: JSP Corporation, Tokyo, Japan

[21] Appl. No.: 208,677

[22] Filed: Mar. 11, 1994

[30]  Foreign Application Priority Data

Mar. 17, 1993 [JP] Japan ................................. 5-082676

[51] Int. Cl.⁶ ................................. C08J 9/16; C08J 9/18
[52] U.S. Cl. ................................. 521/56; 521/59; 521/60; 521/143; 521/144
[58] Field of Search ................................. 521/56, 59, 60, 521/143, 144

[56]  References Cited

U.S. PATENT DOCUMENTS

| 4,644,013 | 2/1987 | Fujie et al. ................. | 521/143 |
| 4,948,817 | 8/1990 | Kuwabara et al. ................. | 521/143 |

*Primary Examiner*—Nathan M. Nutter
*Assistant Examiner*—John M. Cooney, Jr.
*Attorney, Agent, or Firm*—Sherman and Shalloway

[57]  ABSTRACT

The present invention relates to uncrosslinked polyethylene particles for the production of expanded particles that can easily and securely produce expanded particles which can be molded without applying a special internal pressure, are excellent in moldability, such as secondary expansion, fusion and dimensional accuracy, and have a high expansion rate and to uncrosslinked polyethylene expanded particles made of said uncrosslinked polyethylene particles. The present uncrosslinked polyethylene particles for the production of expanded particles are resin particles whose base resin is an uncrosslinked polyethylene having a density of over 0.920 g/cm³ and up to and including 0.940 g/cm³ and wherein, in the DSC curve that is obtained by using a differential scanning calorimeter in such a manner that after 1 to 10 mg of the resin particles is heated to 200° C. at 10° C./min and then is cooled to room temperature at 10° C./min, heating is again carried out to 200° C. at 10° C./min and during the second heating the measurement for the DSC curve is carried out, $q_1/q_{total} \geq 0.5$ wherein $q_1$ stands for the quantity of heat absorbed in the range of the DSC curve of from 50° C. to (the melting point−10) ° C. in terms of J/g and $q_{total}$ stands for the total quantity of absorbed heat of the DSC curve of from 50° C. to the temperature at which the melting is completed in terms of J/g is satisfied, and the temperature width at ½ of the peak height h of the endothermic peak whose apex is at 115° C. or higher is 5° C. or more. Further, the present uncrosslinked polyethylene expanded particles are obtained by impregnating the above resin particles with an expanding agent, dispersing the resin particles in a dispersing agent in a closed vessel, and discharging the resin particles and the dispersing medium from the vessel at a temperature equal to or over the softening temperature of the resin particles into a low-pressure region.

13 Claims, 12 Drawing Sheets

F I G. 12
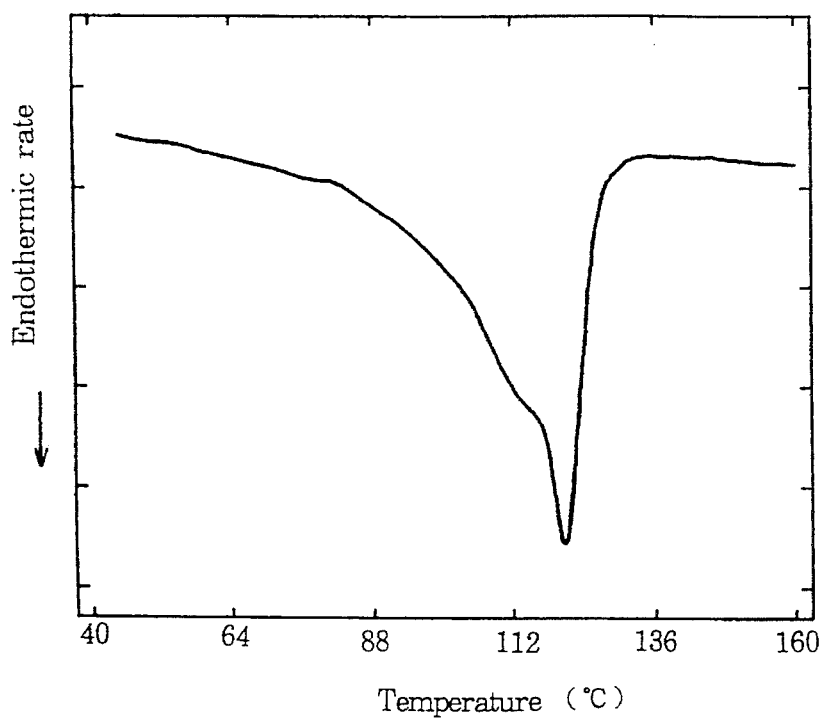
F I G. 13
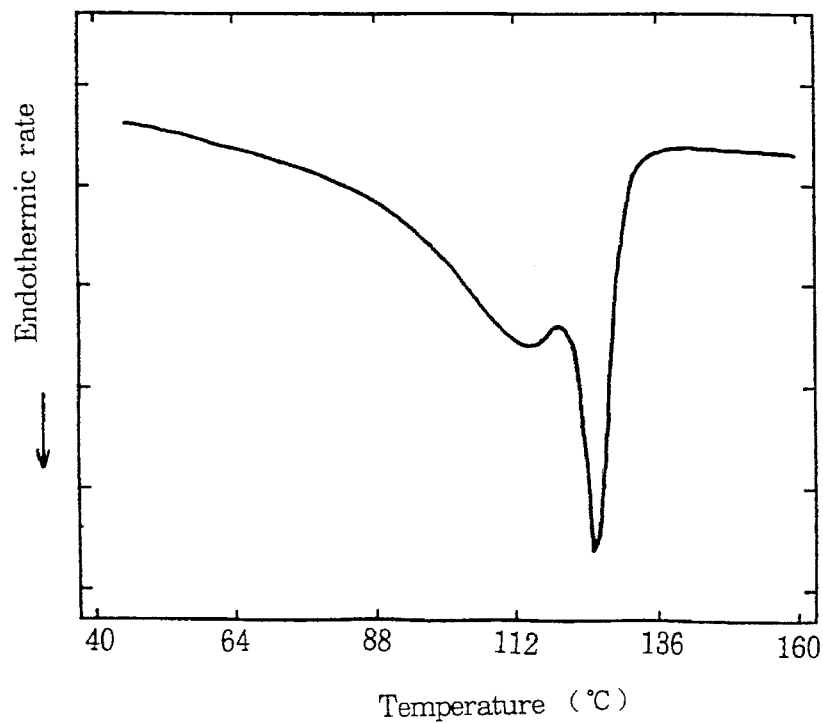

Temperature (°C)

Temperature (°C)

UNCROSSLINKED POLYETHYLENE PARTICLES FOR THE PRODUCTION OF EXPANDED PARTICLES AND UNCROSSLINKED POLYETHYLENE EXPANDED PARTICLES

BACKGROUND OF THE INVENTION

1) Field of the Invention

The present invention relates to uncrosslinked polyethylene particles to be expanded and uncrosslinked polyethylene expanded particles obtained therefrom.

2) Description of the Prior Art

A method of molding expanded particles of uncrosslinked straight-chain low-density polyethylene (hereinafter abbreviated to LLDPE) in a mold is suggested in Japanese Patent Publication No. 10047/1985, but in the case of expanded particles whose base resin is a polyethylene such as LLDPE, unless the expanded particles are given expandability for pressure pretreatment, satisfactory secondary expansion in a mold is not effected and it is difficult to obtain good molded products because the heating temperature range at the molding of the expanded particles in which a good molded product can be obtained is narrow and the adjustment of satisfactory heating to a proper heating temperature at the molding of the expanded particles is difficult and because of the crystalline structure of the polyethylene. Therefore, when uncrosslinked straight-chain low-density polyethylene expanded particles are molded, generally, a technique is used wherein, prior to the molding, the same expanding agent gas or an inorganic gas, such as air, is further added to increase the internal pressure. However, this technique wherein the same expanding gas or an inorganic gas is further added to expanded particles is attended with the problem that not only the equipments are massive but also the number of steps increases, leading to a high production cost of the molded products. Further, in general, in the case of polyolefin resin expanded particles, even if the internal pressure is increased by further adding an inorganic gas or the like to give expandability to the expanded particles, since the pressure in the particles easily escapes, it is difficult to keep the expandability for a long period of time, and therefore in order to obtain excellent molded products by the conventional technique, after giving the internal pressure, the expanded particles have to be used in a short period of time, so that the molder cannot produce molded products easily by using simply the expanded particles directly supplied from the producer of the expanded particles.

As means of solving these problems, the applicant suggested, as LLDPE expanded particles capable of being molded without specifically giving an internal pressure, LLDPE expanded particles having a crystalline structure wherein two endothermic peaks appear in a DSC curve obtained by differential scanning calorimetry (hereinafter referred to as DSC), the DSC curve being obtained by heating 1 to 10 mg of the pre-expanded particles to 220° C. at a rate of temperature rise of 10° C./min by a differential scanning calorimeter, and the energy of the endothermic peak on the higher temperature side is 5 J/g or over (Japanese Patent Application Laid-Open No. 1741/1989).

However, in LLDPE particles that are a raw material of such LLDPE expanded particles, the proper expanding temperature range suitable for expansion is very narrow, and therefore it was quite difficult to obtain expanded particles securely wherein two endothermic peaks appear in the above DSC curve and the energy of the endothermic peak on the higher temperature side is 5 J/g or over.

Thus, the applicant suggested a method wherein use is made of, as raw material resin particles of expanded particles, LLDPE particles having a crystalline structure in which a double peak appears in the DSC curve so that LLDPE expanded particles having a double peak in the DSC curve can be obtained securely (Japanese Patent Application Laid-Open No. 43206/1990).

However, even when the LLDPE particles having a crystalline structure wherein a double peak appears in the DSC curve are used, the expanding proper temperature range for obtaining expanded particles in which a double peak appears in the DSC curve is not very wide and it is hard to say that intended expanded particles can be produced securely. In addition, halogenated hydrocarbon expanding agents conventionally used as excellent expanding agents cannot be used because there is the problem of destroying the ozonosphere and in the case of inorganic gas expanding agents that are conventionally not used as expanding agents for uncrosslinked LLDPE, there is the problem that it is difficult to securely obtain uncrosslinked LLDPE expanded particles having a double peak at a high expansion rate.

Further, even LLDPE expanded particles wherein a double peak appears in the DSC curve of the expanded particles and that can be molded without pressurizing pretreatment are attended with problems to be solved in view of the moldability. That is, if the energy of the endothermic peak of the double peak on the higher temperature side is great, the fusibility between the expanded particles at the time of molding is poor and the expandability of the expanded particles is low. Thus, if the molding temperature is increased in order to make good the expandability and fusibility of the expanded particles, such a problem arises that the surface of the expanded molded product is melted to make the state of the surface degraded. On the other hand, if the energy of the endothermic peak on the high temperature side is small, even at the usual molding temperature the dimension of the molded product is degraded since the molded product is high in shrinkage. Thus, if the molding temperature is lowered, the degradation of the dimensional accuracy can be prevented, but the fusibility between the expanded particles becomes poor and a good molded product cannot be obtained.

Thus, in the case of the conventional expanded particles, in addition to the problem that it is difficult to obtain expanded particles having a high expansion rate when inorganic gases are used as expanding agents, there is the problem that it is difficult to obtain a good molded product excellent in the state of the surface, in the fusibility, in the secondary expandability, and in the dimensional accuracy.

SUMMARY OF THE INVENTION

The inventors have studied keenly to overcome the above problems and have found that the above problems can be overcome by using, as a raw material for the production of expanded particles, novel uncrosslinked LLDPE particles wherein, in the DSC curve of the resin particles, there is a specific relationship between the quantity of heat absorbed in the range from 50° C. to (the melting point−10)° C. and the total quantity of heat absorbed in the range from 50° C. to the temperature at which the melting is completed and the temperature width at ½ of the peak height of the endothermic peak whose apex is located on the side of the temperature higher than 115° C. is 5° C. or more, leading to the completion of the present invention.

The present resin particles are resin particles for the production of expanded particles whose base resin is an uncrosslinked polyethylene, wherein the uncrosslinked polyethylene that is the base resin of said resin particles has a density of over 0.920 g/cm$^3$ and up to and including 0.940 g/cm$^3$, and in the DSC curve of said resin particles that is obtained by using a differential scanning calorimeter in such a manner that after 1 to 10 mg of the resin particles is heated to 200° C. at 10° C./min and then is cooled to 40° C. at 10° C./min, heating is again carried out to 200° C. at 10° C./min and during the second heating the measurement for the DSC curve is carried out, $q_1/q_{total} \geq 0.5$ wherein $q_1$ stands for the quantity of heat absorbed in the range of the DSC curve of from 50° C. to (the melting point–10)° C. in terms of J/g and $q_{total}$ stands for the total quantity of absorbed heat of the DSC curve of from 50° C. to the temperature at which the melting is completed in terms of J/g is satisfied, and the temperature width at ½ of the peak height of the endothermic peak whose apex is located on the side of the temperature higher than 115° C. is 5° C. or more.

Further, the present expanded resin particles are expanded particles that are obtained by dispersing resin particles impregnated with an expanding agent into a dispersing medium in a closed vessel and releasing the resin particles and the dispersing medium from the closed vessel at the softening temperature of the resin particles or a temperature higher than that into a low-pressure region, wherein the base resin of the resin particles is an uncrosslinked polyethylene having a density of over 0.920 g/cm$^3$ and up to and including 0.940 g/cm$^3$, and said resin particles are such uncrosslinked polyethylene particles that, in the DCS curve of said resin particles that is obtained by using a differential scanning calorimeter in such a manner that after 1 to 10 mg of the resin particles is heated to 200° C. at 10° C./min and then is cooled to 40° C. at 10° C./min, heating is again carried out to 200° C. at 10° C./min and during the second heating the measurement for the DSC curve is carried out, $q_1/q_{total} \geq 0.5$, wherein $q_1$ stands for the quantity of heat absorbed in the range of the DSC curve of from 50° C. to (the melting point–10)° C. in terms of J/g and $q_{total}$ stands for the total quantity of absorbed heat of the DSC curve of from 50° C. to the temperature at which the melting is completed in terms of J/g, is satisfied, and the temperature width at ½ of the peak height of the endothermic peak whose apex is located on the side of the temperature higher than 115° C. is 5° C. or more.

DETAILED DESCRIPTION OF THE INVENTION

In the present invention, as is shown in FIG. 1, the quantity $q_1$ of heat absorbed in the range of from 50° C. to (the melting point–10)° C. is the quantity of absorbed heat of the part that is surrounded by the line b connecting the point at the temperature of 50° C. on the DSC curve to the point of the temperature at which the melting is completed on the DSC curve and the DSC curve and is on the side of the temperature lower than {the melting point (that is the temperature of the apex of the peak, that apex being on the side of the temperature higher than 115° C., i.e. the temperature at the intersection point a of the tangent line d and the tangent line e as shown in FIG. 1)–10° C.}.

$q_{total}$ is the total quantity of absorbed heat of the DSC curve from 50° C. to the temperature at which the melting is completed and is the quantity of absorbed heat corresponding to the part surrounded by the line b and the DSC curve shown in FIG. 1.

In the present invention, it is essential that $q_1/q_{total} \geq 0.5$ and if $q_1/q_{total} < 0.5$, because the fusibility between the expanded particles at the time of molding in a mold is poor, molding becomes impossible unless the steam pressure is increased, and as a result the molded product has shrinkage, the surface of the molded product is melted, or the interfaces between the grains of expanded particles are fused excessively, not resulting in a molded product good in the state of the surface. Further, preferably the quantity of heat absorbed $q_{total}$ when melted is 90 J/g or more.

Next, it is shown how to find the peak height h of the endothermic peak whose apex is on the side of the temperature higher than 115° C. For example, as is shown in FIG. 1, if there are two or more endothermic peaks and there is only one endothermic peak at 115° C. or higher, the tangent line that is tangent to the higher temperature side of the endothermic peak at 115° C. or higher and whose gradient is largest, i.e. the tangent d, and the tangent line that is tangent to the lower temperature side of the endothermic peak at 115° C. or higher and whose gradient is largest in terms of absolute value, i.e. the tangent e, are drawn. By drawing a perpendicular to the line b from the intersection point a of them and designating the intersection point of the perpendicular and the line b as c, the length of the segment ac is designated as the peak height h. Further, if there is only one endothermic peak in the DSC curve and the temperature of the apex of said endothermic peak is 115° C. or higher, for said endothermic peak the peak height h is found in the same way as above. Further, as is shown in FIG. 2, if there are two or more endothermic peaks and two or more endothermic peaks wherein the temperature of the apexes of the peaks is 115° C. or higher are present, the tangent line that is tangent to the higher temperature side of the highest-temperature side peak out of the endothermic peaks wherein the temperature of the apexes is 115° C. or higher and whose gradient is largest, i.e. the tangent line d and the tangent line that is tangent to the low-temperature side of the lowest-temperature side peak out of the endothermic peaks wherein the temperature of the apexes is 115° C. or higher and whose gradient is largest in terms of absolute value, i.e. the tangent line e are drawn. Then the peak height h is found in the same way as above, except that the intersection point of these tangent lines is designated as a.

Further, as is shown in FIG. 1, the temperature width w at ½ of the peak height h of the endothermic peak wherein the temperature of the apex is 115° C. or higher (hereinafter referred to as the half width of the endothermic peak) is the length of the part of the line segment that is passed through the mid point of the peak height h, is parallel to the line b, and is located between the tangent line d and the tangent line e.

In the present invention, it is essential that the half width w of the above endothermic peak is 5° C. or more and if the half width of the endothermic peak is less than 5° C., because the proper expanding temperature range is narrow so that it is difficult to prevent the energy of the endothermic peak on the higher temperature side of expanded particles from varying, it is difficult to obtain pre-expanded particles good in moldability in a mold.

Preferably, the uncrosslinked polyethylene particles of the present invention has an MI of 0.1 to 5 g/10 min, particularly 0.5 to 3 g/10 min. Particularly preferably the uncrosslinked polyethylene particles of the present invention has an MI of 0.8 g/10 min or over but less than 2.0 g/10 min and/or a melting point of over 120° C. If the MI is less than 0.8 g/10 min and/or the melting point is less than 120° C. or below, the effect of improving the expansion rate is not remarkable and if the MI is 2.0 g/10 min or over, the rate of the closed cells is liable to be down. The uncrosslinked polyethylene particles wherein the n-hexane extract is 0.3 to 1.5% are preferable because they are excellent in expandability and can produce expanded particles high in cell strength. It is essential that the uncrosslinked polyethylene constituting the present resin particles has a density of over 0.920 g/cm$^3$ and up to and including 0.940 g/cm$^3$. If the density is 0.920 g/cm$^3$ or below, the expanded particles or the molded product is liable to shrink while if the density is over 0.940 g/cm$^3$, the proper expanding temperature range at the time of expanding is not very wide.

As the uncrosslinked polyethylene that is the base resin of the present resin particles, LLDPE and a mixture of LLDPE and other polyethylene can be mentioned. The above properties in the DSC curve can be obtained, for example, in such a manner that (1) when LLDPE that is obtained as a copolymer of ethylene and an α-olefin is produced, a catalyst or polymerization conditions are selected to make nonuniform the distribution of the ethylene and the α-olefin in the LLDPE or (2) ordinary LLDPE's different from each other in melting point and/or density are mixed or LLDPE is mixed with low-density polyethylene (hereinafter referred to as LDPE) or high-density polyethylene (hereinafter referred to as HDPE).

As the α-olefin having 4 to 10 carbon atoms that constitutes the above LLDPE, for example, 1-butene, 1-pentene, 1-hexene, 3,3-dimethyl-1-butene, 4-methyl-1-pentene, 4,4-dimethyl-1-pentene, and 1-octene can be mentioned. The content of these α-olefins in the LLDPE is preferably 1 to 20% by weight, particularly preferably 3 to 10% by weight. If the content of α-olefins in the LLDPE exceeds 20% by weight, in some cases the strength, for example, against bending or compression is liable to be down.

If two or more kinds of LLDPE's different from each other in melting point or density are mixed, the densities of the LLDPE's are preferably selected such that if the density of one of the LLDPE's is designated as d (g/cm$^3$), the density of at least one of the other LLDPE's is d+ 0.005 (g/cm$^3$) or over and preferably the difference in melting point is 5° to 15° C. If HDPE is mixed with LLDPE, letting the density and the melting point of the LLDPE be d (g/cm$^3$) and T (°C.), preferably the density and the melting point of the HDPE are selected to be d+ 0.02 (g/cm$^3$) or over and T+ 10 to T+ 20 (°C.) respectively.

When the above method (2) is used, an LLDPE is used as a major component and other LLDPE different from the former LLDPE in density or in melting point or other polyethylene such as LDPE and HDPE is mixed therewith by a conventional known method such as the dryblending method and the master batch method. In this case the mixing ratio is preferably such that to 100 parts by weight of one LLDPE, 20 to 60 parts by weight of the other LLDPE or 2 to 30 parts by weight of HDPE is mixed and further as a third component 10 parts by weight or less of LDPE can be added thereto. Preferably, the resins to be mixed have an MI of 0.5 to 3 g/10 min and further if the LLDPE that is a major component has an MI of m (g/10 min), preferably the resins to be mixed have an MI of m± 2 (g/10 rain).

If as the base resin a mixture of polyethylene resins is used, it is preferable that an LLDPE having a density of 0.925 g/cm$^3$ or less is mixed as one component, because the adjustment of the present resin particles becomes easy.

When the above resins are mixed, if they are selected using the DSC curves of the respective resins as guidelines, the process of adjusting the resin to obtain the intended pattern of the DSC curve can be simplified. That is, when resins having different properties from each other are mixed to obtain a resin mixture different from the original resins in property, the shape of the DSC curve of the resin mixture has a peak height approximately in proportion to the mixing ratio of the original resins and is approximately similar to the shape obtained by superimposing the shapes of the DSC curves of the original resins.

In order to obtain a resin mixture having a DSC curve that satisfies the relationship $q_1/q_{total} \geq 0.5$ and the half width $w \geq 0.5$ (°C.), for example, a resin mixture having a DSC curve as shown in FIG. 3 by using the above resins, a resin 1 and a resin 2 whose difference in melting point is 5° C. or over are selected to secure $w \geq 0.5$ (°C.) and a resin 3 whose DSC curve has a broad wing on the low-temperature side and shows a great quantity of heat absorbed on the low-temperature side is selected to secure $q_1/q_{total} \geq 0.5$ and these resins are mixed in a suitable ratio such that the heights of the peaks are brought near to the peak height of the DSC curve of the intended resin mixture. The present resin particles can also be adjusted by mixing two kinds of resins. In this case, it is easy to adjust the mixture such that one or both of the two resins satisfy the relationship that the temperature width w of the endothermic peak on the high-temperature side or the value of the $q_1/q_{total}$ falls in the range of the present invention. The resin particles of the present invention can be adjusted not only by mixing the above two kinds of resins or three kinds of resins but also by mixing a number of resins.

To form the resin into particles, for example, after the above resins are melted in an extruder and then are extruded from the extruder into strands, the strands are quenched and cut. Incidentally, the present resin particles are obtained in such a manner that the resins obtained in the above adjusting method are finally subject to DSC and further selection is made based on the results of the measurement.

With respect to the DSC curve obtained by second heating in the DSC, uncrosslinked LLDPE particles for the production of expanded particles that are conventionally used do not satisfy the above-described conditions possessed by the present resin particles. Specifically, for example, as is shown in FIG. 20, there is only one sharp peak and the quantity of heat absorbed in the low-temperature part is small, and the expanding temperature range of the particles at the time of pre-expansion is narrow and the obtained pre-expanded particles are poor in fusibility at the time of molding. Further as is shown in FIG. 12, even if the temperature width of the high-temperature side peak is wide, if the quantity of heat absorbed in melting in the low-temperature part is small, the expanding temperature range is wide, but the obtained pre-expanded particles are poor in fusibility at the time of molding. Further as is shown in FIG. 10, with respect to those wherein although the quantity of heat absorbed in melting in the low-temperature part is large, the temperature width of the high-temperature side peak is narrow, the proper expanding temperature range for obtaining pre-expanded particles having good moldability in a mold is narrow and pre-expanded particles cannot be obtained securely.

In contrast to these conventional uncrosslinked LLDPE's, in the case of the present uncrosslinked polyethylene particles, like DSC curves as shown in FIGS. 4, 5, and 13 to 15, the half width of the endothermic peak whose peak temperature is 115° C. or higher is wide and the quantity of absorbed heat in the low-temperature part is large. This reason seems to be attributed to that, in the case wherein the uncrosslinked polyethylene comprises LLDPE only, the distribution of the α-olefin in the LLDPE molecular chain or among the LLDPE molecular chains is not uniform and therefore the crystalline structure is extensive. In the case of a mixture of LLDPE's or a mixture of an LLDPE and an HDPE or the like, the reason seems to be attributed to that, by mixing resins different in the crystalline structure and the distribution and/or the content of the α-olefin, the quasi-crystalline structure is extensive.

Into the present resin particles, an inorganic material can be incorporated if required. As the inorganic material, for example, an inorganic hydroxide, such as aluminum hydroxide, calcium hydroxide, and magnesium hydroxide, an inorganic carbonate, such as calcium carbonate, magnesium carbonate, and barium carbonate, an inorganic sulfite, such as calcium sulfite and magnesium sulfite, an inorganic sulfate, such as calcium sulfate, aluminum sulfate, manganese sulfate, and nickel sulfate, an inorganic oxide, such as calcium oxide, aluminum oxide, and silicon oxide, an inorganic chloride, such as sodium chloride, magnesium chloride, and calcium chloride, and a natural mineral, such as borax, talc, clay, kaolin, and zeolite can be mentioned.

The above inorganic materials can be used singly or as a mixture of two or more and may be mixed with the melted resin in an extruder from which the melted resin will be extruded into pellets. The inorganic material is added generally in the form of powder and there are no particular restrictions on the inorganic material if the particle diameter falls within a range that is generally used. However it is preferable that the particle diameter is generally 0.1 to 100 μm, particularly 1 to 15 μm.

Preferably the content of the inorganic material in the resin particles is 0.001 to 5% by weight and particularly in the case wherein the inorganic material is talc, the content is preferably 0.003 to 0.5% by weight while in the case of borax, aluminum hydroxide, or zeolite, the content is preferably 0.1 to 2% by weight. When the content of the inorganic material exceeds 5% by weight, the moldability of the expanded particles becomes poor. In the present invention, preferably the resin particles containing an inorganic material have generally a particle diameter of 0.3 to 5 mm, particularly 0.5 to 3 mm.

In the production of expanded particles by using the present resin particles for the production of expanded particles, it is suggested that the dispersing medium in which the resin particles will be dispersed are those that do not dissolve the resin particles, such as water, ethylene glycol, glycerin, methanol, and ethanol, and generally water is used as the dispersing medium.

The process wherein the resin particles are impregnated with an expanding agent may be carried out before or after the process wherein the resin particles are dispersed in a dispersing medium in a closed vessel, but generally is carried out simultaneously with the process wherein the resin particles are dispersed. In the above case, it seems that the expanding agent is once dissolved or dispersed in the dispersing medium and then is impregnated into the resin particles, so that the expanding agent can be impregnated into the resin particles, for example, in such a manner that the resin particles, the expanding agent, and the dispersing medium are placed in a closed vessel and are heated or placed under pressure with stirring.

The expanding agent used in the production of the present expanded particles may be any of volatile expanding agents, such as propane, butane, pentane, hexane, cyclobutane, cyclohexane, trichlorofluoromethane, and dichlorodifluoromethane, and inorganic gas expanding agents, such as nitrogen, carbon dioxide, argon, and air, with particular preference given to carbon dioxide or a mixture of carbon dioxide with a volatile expanding agent. When the above inorganic gas expanding agent or a mixture of the above inorganic gas expanding agent with the above volatile expanding agent is used as an expanding agent, preferably the expanding agent is supplied into the vessel so that the pressure in the vessel may be 60 kg/cm$^2$.G or below.

In the production process for the present particles, when the resin particles are dispersed in a dispersing medium and they are heated to an expanding temperature (the temperature at which the resin particles and the dispersing medium are discharged from the vessel), a fusion preventive agent for preventing the resin particles from being fused can be used. As the fusion preventive agent, any of inorganic fusion preventive agents or organic fusion preventive agents that do not dissolve in the dispersing medium such as water and will not be melted by heating can be used and generally an inorganic fusion preventive agent is preferable. As an inorganic fusion preventive agent, for example, aluminum oxide, titanium oxide, aluminum hydroxide, basic magnesium carbonate, basic zinc carbonate, calcium carbonate, calcium phosphate, magnesium pyrophosphate, and talc can be mentioned.

Preferably the above fusion preventive agent has a particle diameter of 0.001 to 100 μm, particularly 0.001 to 30 μm. Preferably the amount of the fusion preventive agent to be added is generally 0.01 to 10 parts by weight per 100 parts by weight of the resin particles.

When the above inorganic fusion preventive agent is added, an emulsifying agent can also be added. As the above emulsifying agent, an anionic surface-active agent, such as sodium dodecylbenzenesulfonate and sodium oleate, is preferable. Preferably the emulsifying agent is added generally in an amount of 0.001 to 5 parts by weight per 100 parts by weight of the resin particles.

In the production process, when an inorganic gas expanding agent is used as an expanding agent, the expanding temperature is a temperature equal to or above the softening temperature of the resin particles and preferably is a temperature near the melting point of the resin particles, particularly preferably a temperature in the range of from (the melting point−10° C.) or over to (the melting point+ 5° C.) or below. Incidentally, in the present expanded particles, preferably, the quantity of heat absorbed on the high-temperature side is 10 J/g or more.

Further, when a gas mixture of an inorganic gas expanding agent with a volatile expanding agent is used as an expanding agent, the expanding temperature is preferably a temperature in the range of from (the melting point−15° C.) or over to (the melting point+ 10° C.) or below, particularly from (the melting point−10° C.) or over to (the melting point+ 5° C.) or below.

Further, the heating rate at the heating to the expanding temperature is preferably 1° to 10° C./min, particularly 2° to 5° C./min.

In the production process, the pressure of the atmosphere into which the expandable resin particles and the dispersing medium are discharged from the closed vessel may be a pressure lower than the pressure in the vessel and is generally equal to the atmospheric pressure. Further, the temperature of the atmosphere into which the discharge is carried out is generally equal to normal temperatures, but when the temperature of that atmosphere is increased to 60° to 110° C., preferably 80° to 100° C., by heating with a heating medium, such as steam, in comparison with the case wherein the discharge is carried out into an atmosphere having normal temperatures, the expansion rate of the expanded particles is increased about 1.5 to 2.0 times and an effect of increasing the cell diameter is obtained in association therewith, resulting in good moldability.

BRIEF DESCRIPTION OF THE DRAWINGS

FIG. 12 shows the DSC curve obtained in the second heating of Resin I used in Comparative Examples 7 and 8.

FIG. 13 shows the DSC curve obtained in the second heating of Resin Mixture a used in Examples 4 and 7 to 9.

EXAMPLES

Now the present invention will be described in detail with reference the following examples.

Examples 1 to 3 and Comparative Examples 1 to 8

Each of Resins A to I shown in Table 1 was melted in an extruder and was extruded from a die into strands and the strands were quenched in water and cut into pellets each having a weight of about 4 mg. By using a differential scanning calorimeter, after the pellets were heated at a rate of 10° C./min to 200° C. and then were cooled to room temperature at 10° C./min, heating was again carried out at a rate of 10° C./min to 200° C. and during the second heating the measurement for the DSC curve was carried out, the DSC curves being shown in FIGS. 4 to 12. The half widths w of endothermic peaks, the temperature of the apex of which is 115° C. or over and the values of the $q_1/q_{total}$ were also found from the DSC curves and are shown also in Table 1. Incidentally, the DSC curves of Resins A to I correspond to FIGS. 4 to 12 respectively.

Then, from the above respective resin particles, expanded particles were produced. The expanded particles were obtained in such a manner that, as an expanding agent, carbon dioxide or a mixture of carbon dioxide and isobutane was used, 4 g of mica as a dispersant, 0.4 g of sodium dodecylbenzenesulfonate as an emulsifier, and 3 l of water per 100 g of the resin particles were blended in a closed vessel (having a volume of 5 liters), then after they were heated with stirring to the expanding temperature shown in Table 2 without heating to a temperature equal to or over the melting completion temperature of the resin and were kept at the expanding temperature for 15 min, a carbon dioxide back pressure equal to the equilibrium vapor pressure, and with that pressure retained, one end of the vessel is released to discharge the resin particles and the water simultaneously to allow the resin particles to expand. The average bulk expansion rate of the obtained expanded particles and the moldability of the expanded particles are also shown in Table 2. The measurement of the DSC of the respective expanded particles was carried out and the quantities of the heat absorbed on the high-temperature side were determined and are also shown in Table 2. Further, with respect to the expanded particles, the quantities of the heat absorbed on the high-temperature side can be measured by a conventionally known method (e.g., a method described in U.S. Pat. No. 4,948,817).

Example 4 to 6 and Comparative Examples 9 to 11

Figure 1:
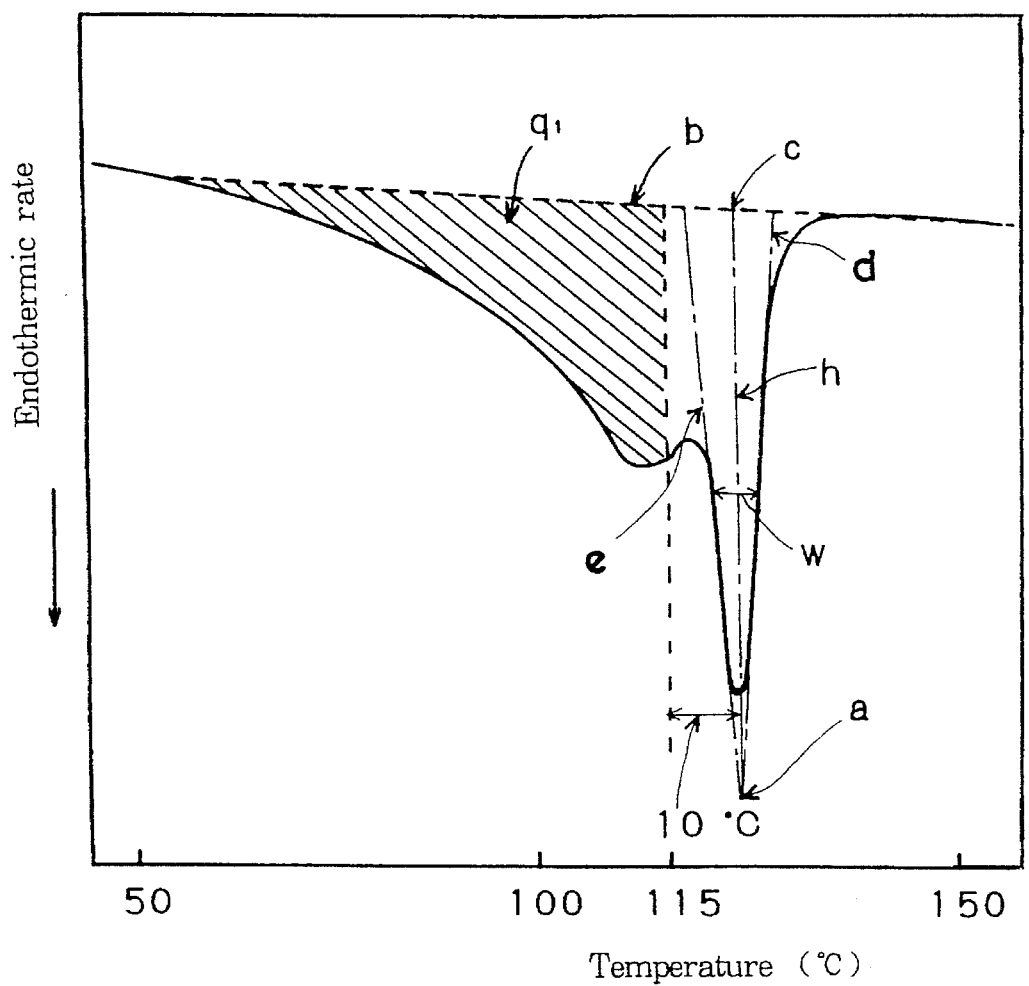
FIG. 1 is an explanatory diagram showing the DSC curve of the present uncrosslinked polyethylene particles for the production of expanded particles.
Figure 2:
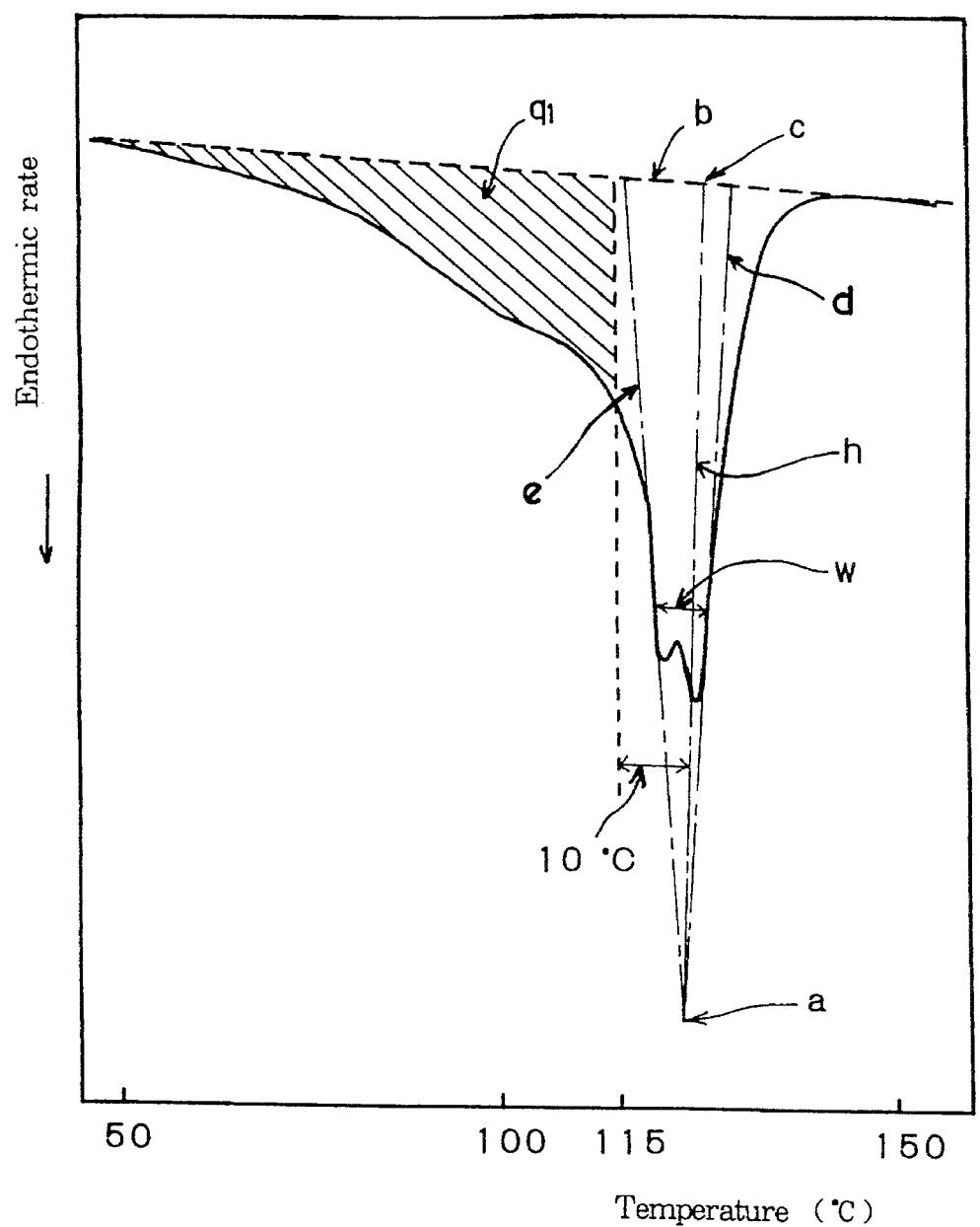
FIG. 2 is an explanatory diagram showing the DSC curve of the present uncrosslinked polyethylene particles for the production of expanded particles, the shape of the DSC curve being different from that of the DSC curve in FIG. 1.
Figure 3:
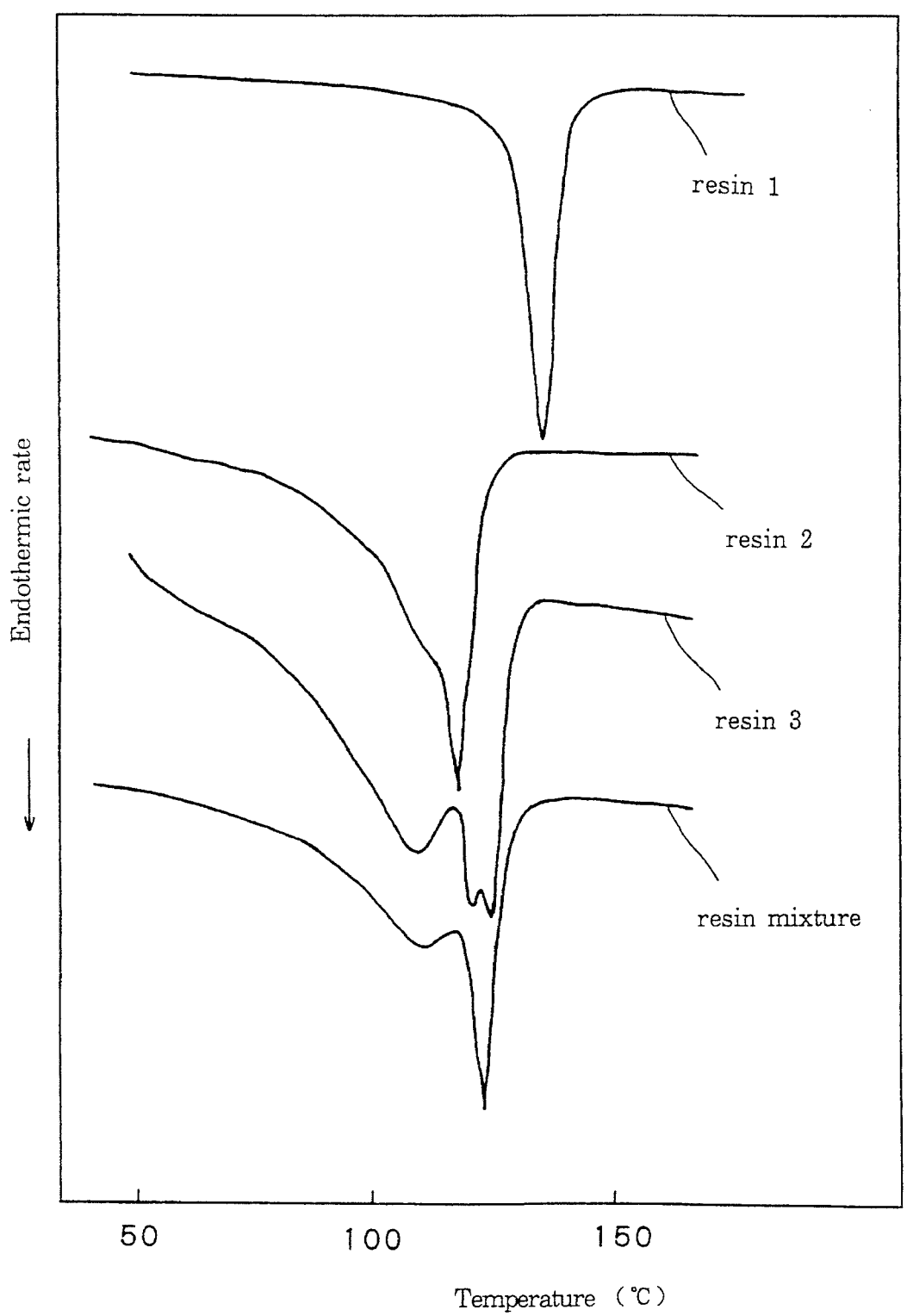
FIG. 3 is an explanatory diagram showing the DSC curve of the present uncrosslinked polyethylene resin particles for the production of expanded particles and the DSC curves of the raw material resins used for adjusting that resin particles.
Figure 4:
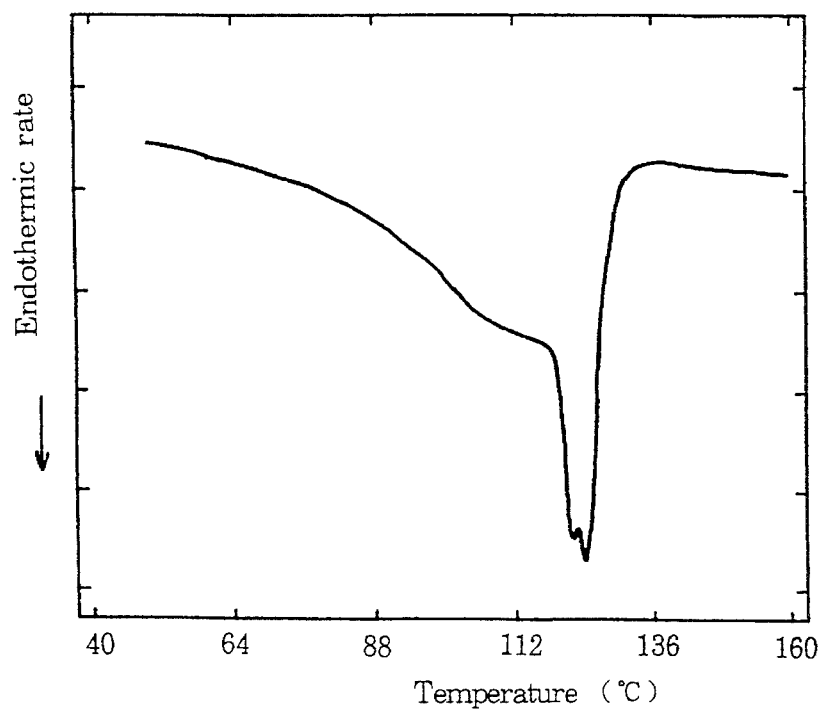
FIG. 4 shows the DSC curve obtained in the second heating of Resin A used in Examples 1 and 2.
Figure 5:
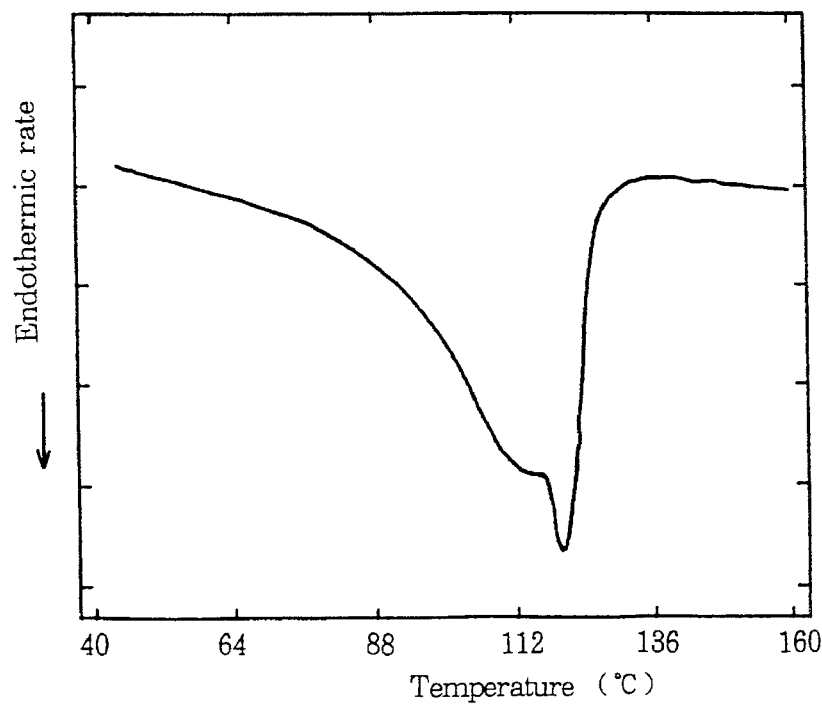
FIG. 5 shows the DSC curve obtained in the second heating of Resin B used in Example 3.
Figure 6:
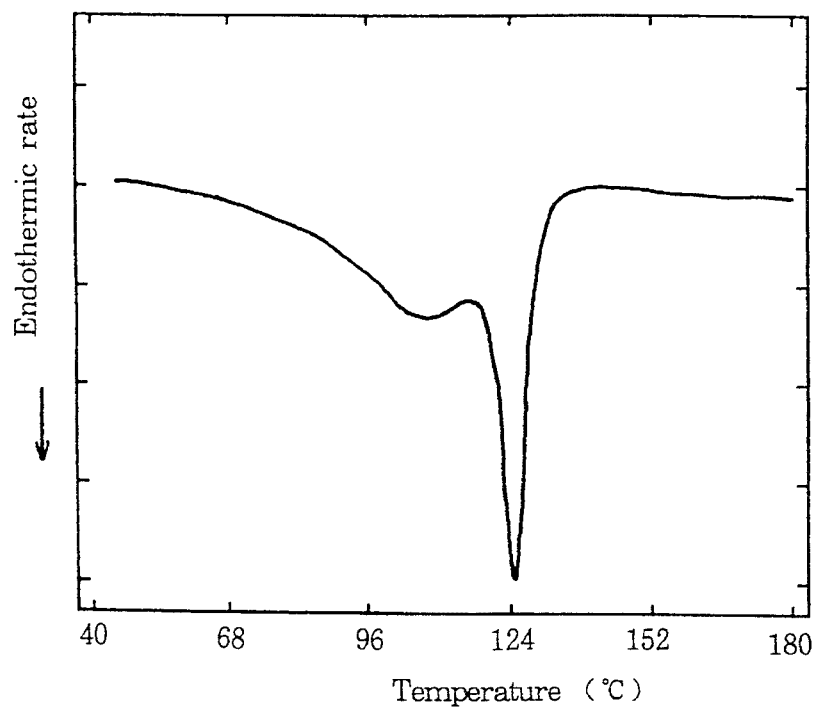
FIG. 6 shows the DSC curve obtained in the second heating of Resin C used in Comparative Example 1.
Figure 7:
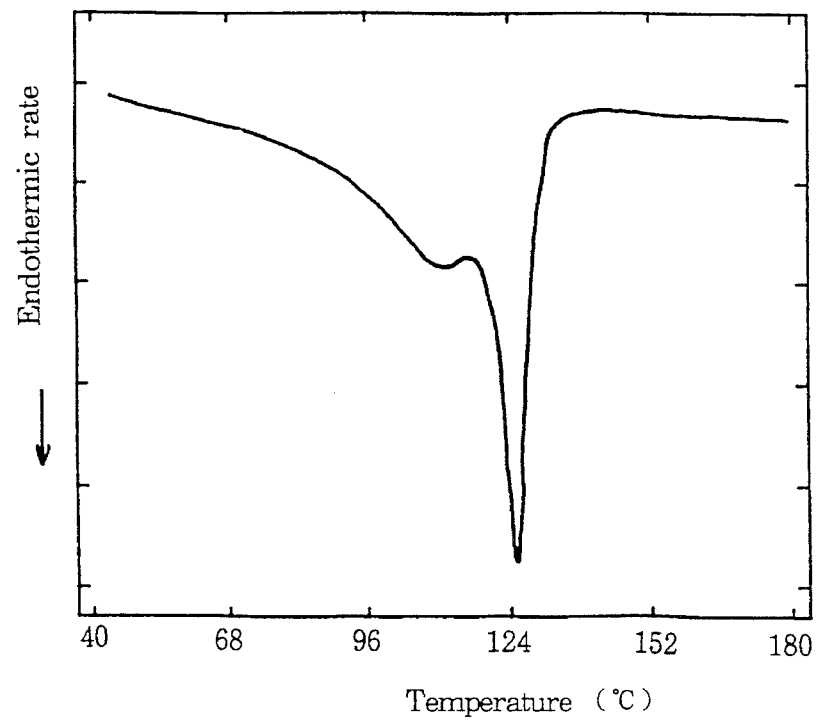
FIG. 7 shows the DSC curve obtained in the second heating of Resin D used in Comparative Example 2.
Figure 8:
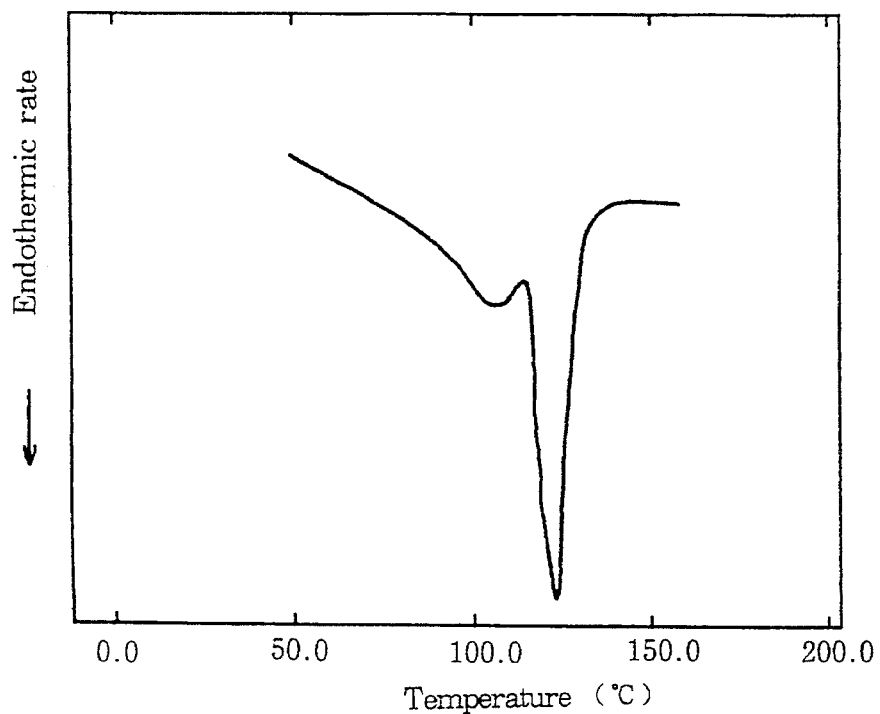
FIG. 8 shows the DSC curve obtained in the second heating of Resin E used in Comparative Example 3.
Figure 9:
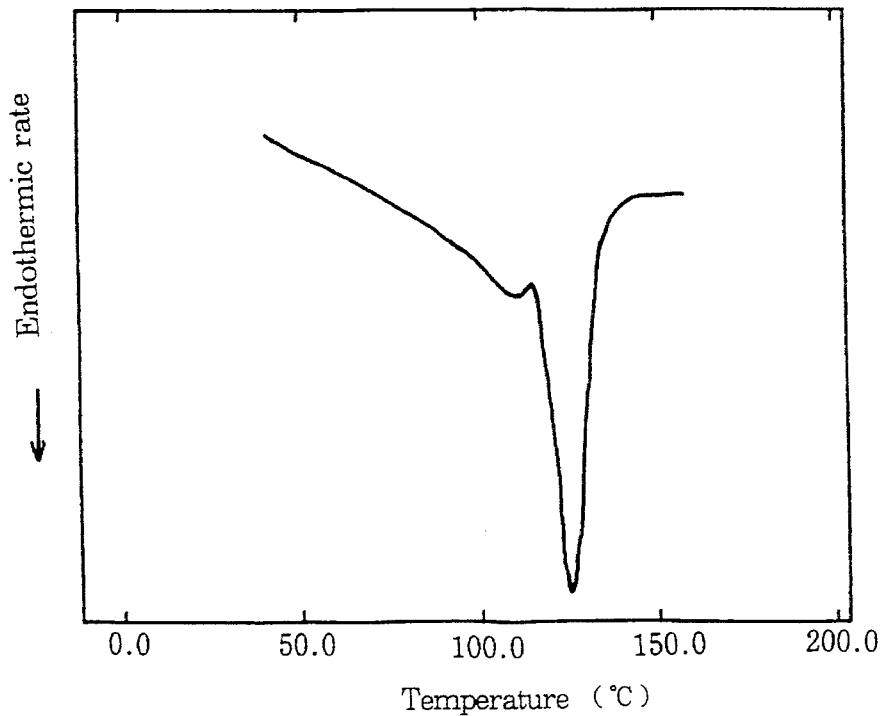
FIG. 9 shows the DSC curve obtained in the second heating of Resin F used in Comparative Example 4.
Figure 10:
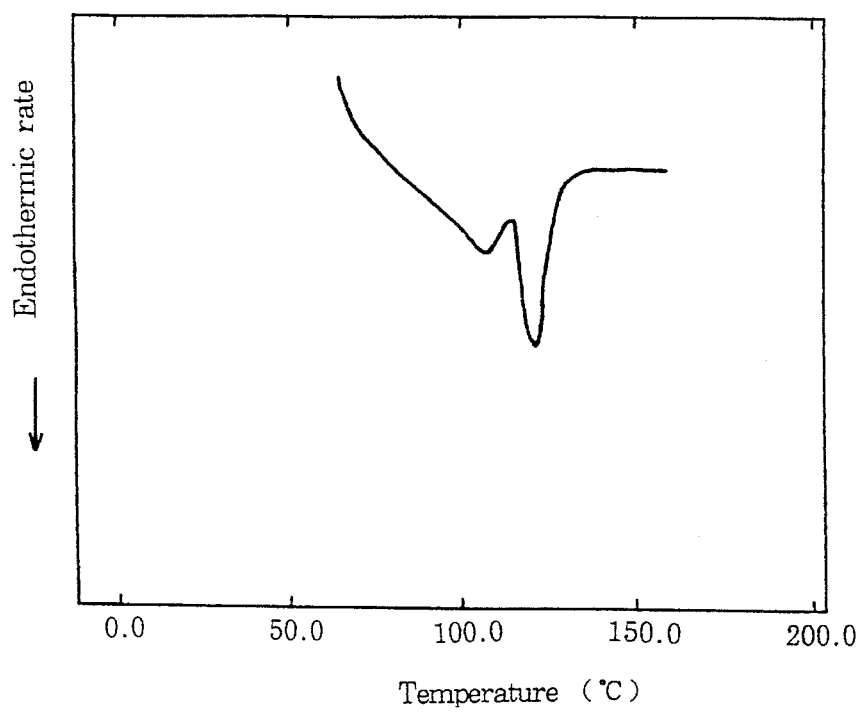
FIG. 10 shows the DSC curve obtained in the second heating of Resin G used in Comparative Example 5.
Figure 11:
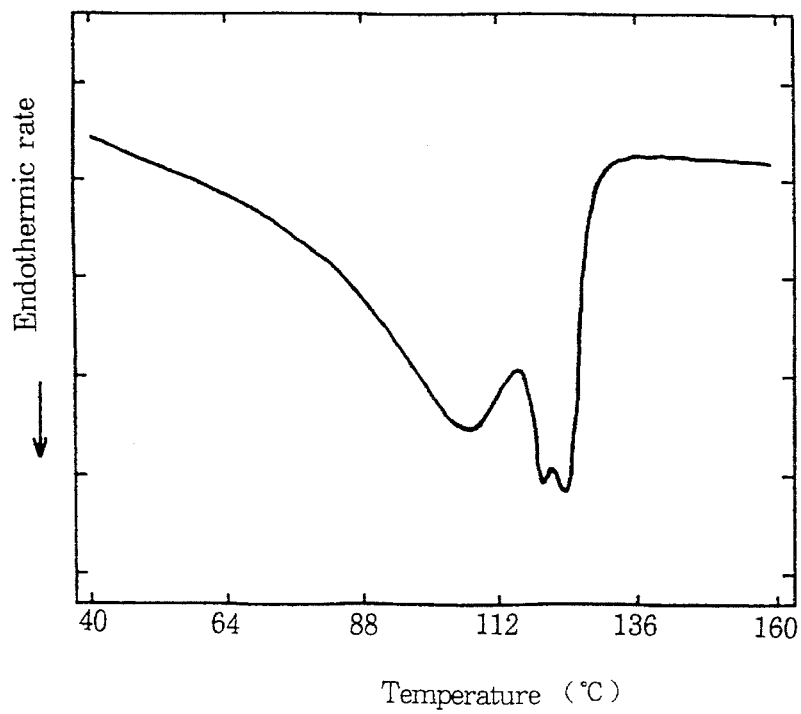
FIG. 11 shows the DSC curve obtained in the second heating of Resin H used in Comparative Example 6.
Figure 14:
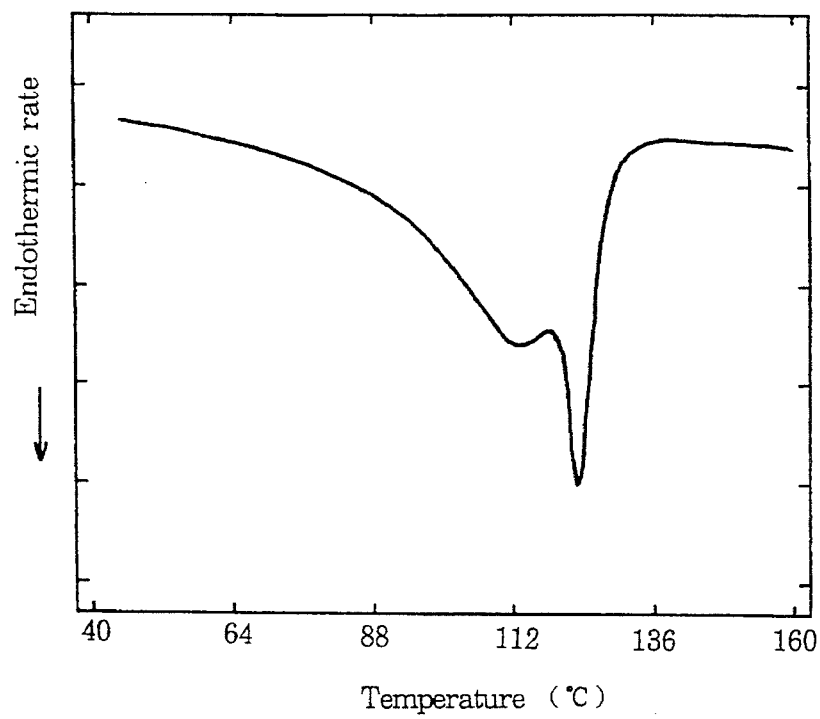
FIG. 14 shows the DSC curve obtained in the second heating of Resin Mixture b used in Example 5.
Figure 15:
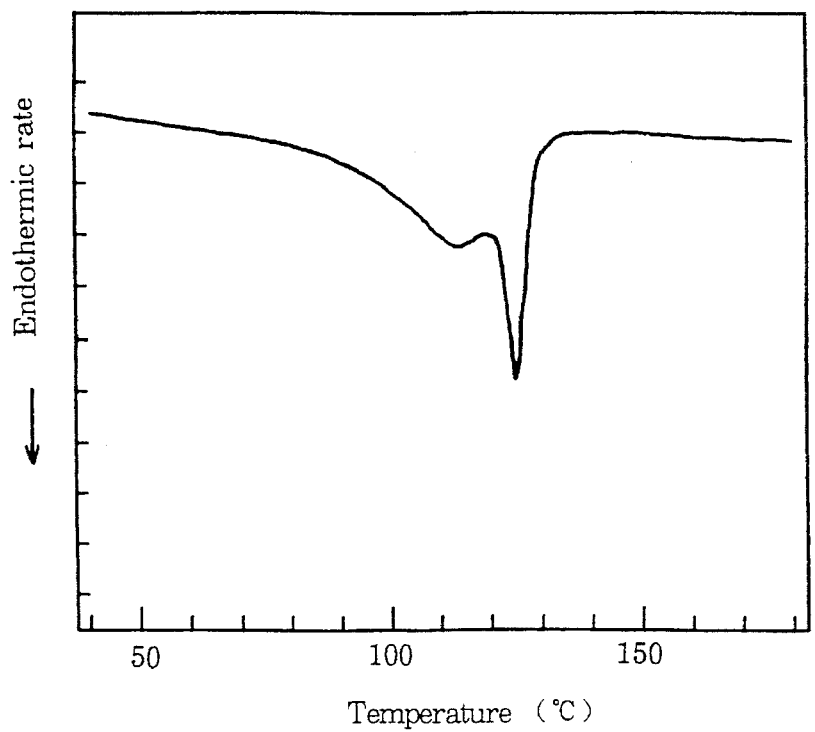
FIG. 15 shows the DSC curve obtained in the second heating of Resin Mixture c used in Example 6.
Figure 16:
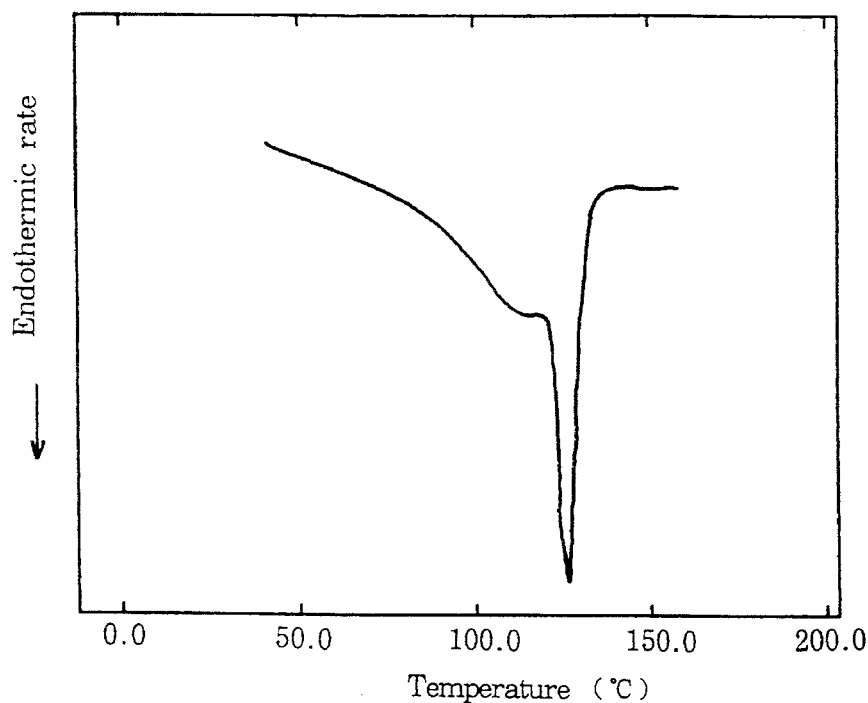
FIG. 16 shows the DSC curve obtained in the second heating of Resin Mixture d used in Comparative Example 9.
Figure 17:
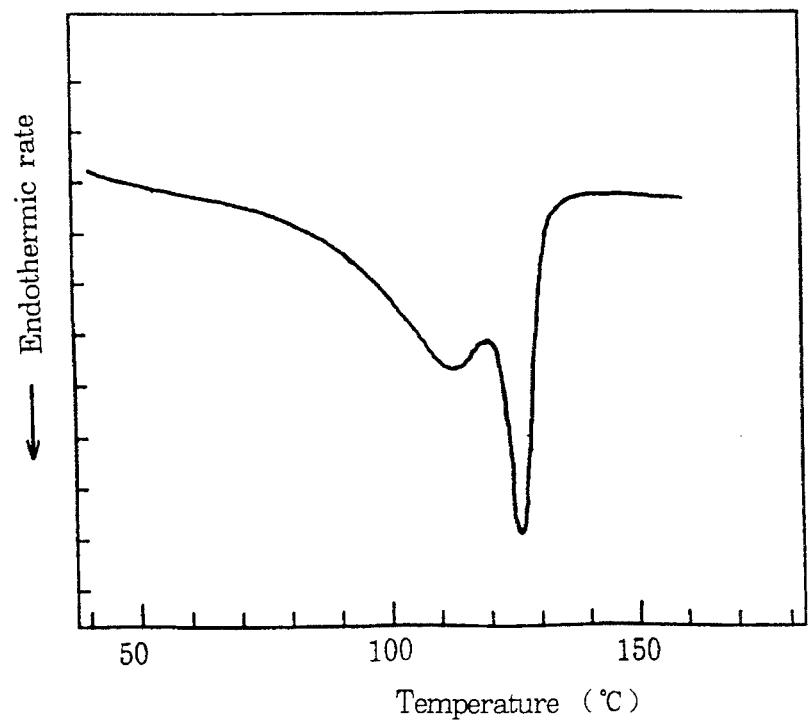
FIG. 17 shows the DSC curve obtained in the second heating of Resin Mixture e used in Comparative Example 10.
Figure 18:
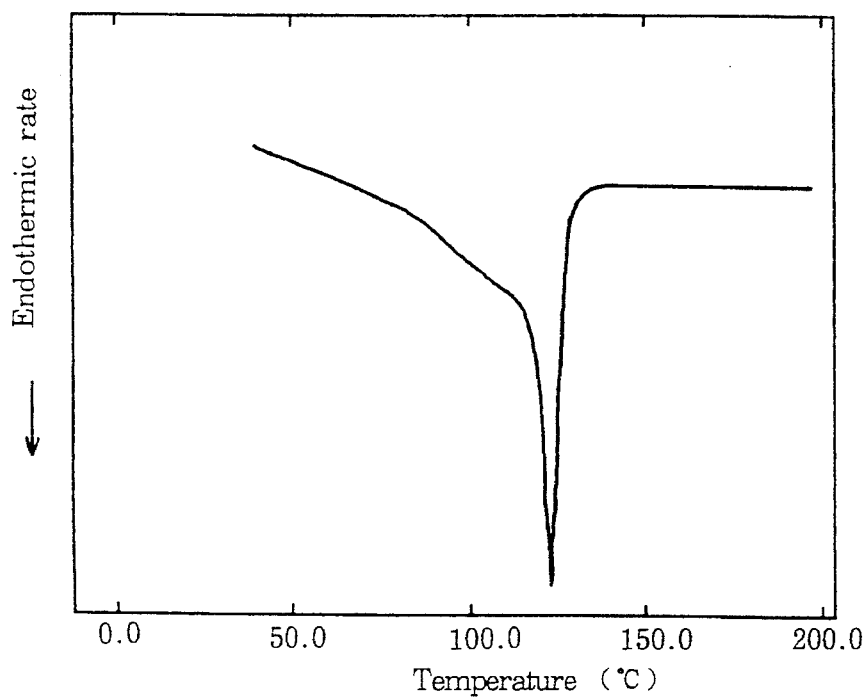
FIG. 18 shows the DSC curve obtained in the second heating of Resin Mixture f used in Comparative Example 11.
Figure 19:
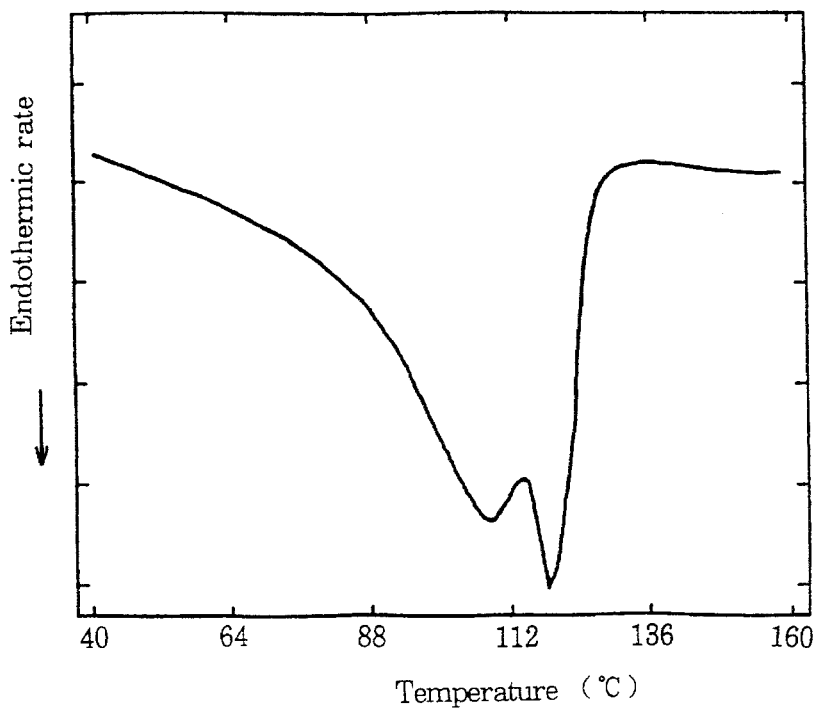
FIG. 19 shows the DSC curve obtained in the second heating of Resin J.
Figure 20:
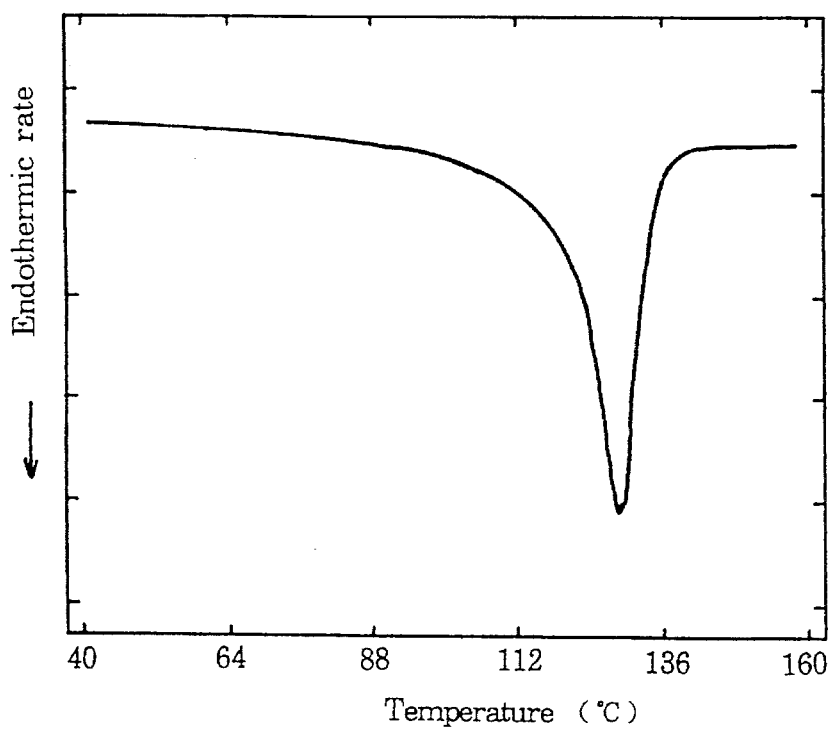
FIG. 20 shows the DSC curve obtained in the second heating of Resin K.
Figure 21:
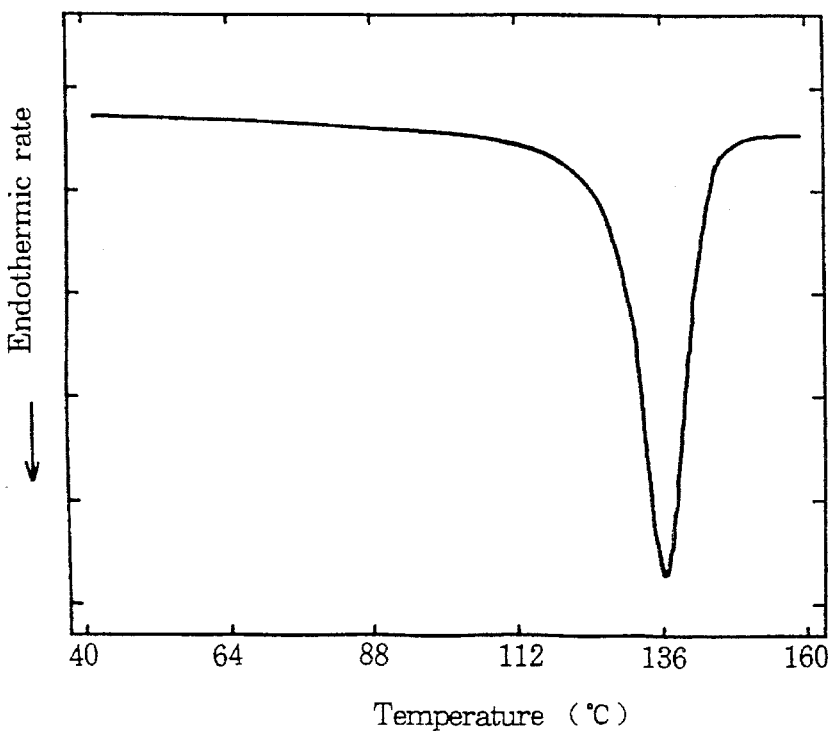
FIG. 21 shows the DSC curve obtained in the second heating of Resin L.

To obtain particles, Examples 1 to 3 were repeated, except that resin mixtures a to f obtained by mixing (dryblending) two or three kinds of resins selected from the resins shown in Table 1 in ratios per 100 g of the resin mixture shown in Table 3. The resin mixture particles were subjected to DSC and the DSC curves obtained in the second heating are shown in FIGS. 13 to 18 (incidentally, the DSC curves of the individual Resins J, K, and L used in the mixing that were obtained in the second heating are shown in FIGS. 19 to 21 respectively). The DSC curves of Resin Mixtures a to f correspond to FIGS. 13 to 18 respectively. The half widths w of endothermic peaks the temperature of the apex of which is 115° C. or over and the values of the $q_1/q_{total}$ were also found from the DSC curves and are shown also in Table 3. From these particles, expanded particles were produced under conditions shown in Table 4 in the same way as in Examples 1 to 3 and the average bulk expansion rates of the expanded particles and the moldability were evaluated, the results being shown in Table 4. The respective expanded particles were subjected to DSC to find the quantities of heat absorbed on the high-temperature side, which are also shown in Table 4.

Examples 7 to 9

In Example 7, to produce expanded particles, Example 8 was repeated, except that when the expandable resin particles and the water were simultaneously discharged from the closed vessel to allow the resin particles to expand, the discharge pipe was heated with steam having a temperature of 100° C., in Example 8, to produce expanded particles, Example 4 was repeated, except that the expanding agent was changed to carbon dioxide, and in Example 9, to produce expanded particles, Example 7 was repeated, except that 0.2% by weight of borax was added to the resin particles. The average bulk expansion rate of the respective expanded particles and the moldability were evaluated and are shown in Table 5. The obtained expanded particles were subjected to DSC to find the quantities of heat absorbed on the high-temperature side, which are also shown in Table 5.

Incidentally, as the evaluation of the moldability of the expanded particles, the evaluation of the dimensional accuracy of the molded products and the fusion and the secondary expansion of the expanded particles was carried out based on the following criteria:

(1) Dimensional accuracy

After the molded product was cured for 24 hours in an oven at 80° C., the shrinkage of the molded product in the direction of the surface was measured and the evaluation was made based on the following criteria:

⊚: the shrinkage in the direction of the surface was less than 2.5%.

○: the shrinkage in the direction of the surface was 2.5% or higher but less than 3%.

Δ: the shrinkage in the direction of the surface was 3% or higher but less than 4%.

x: the shrinkage in the direction of the surface was 4% or over.

(2) Fusion

A slice obtained by cutting the molded product so that the vertical cross section in the direction of the width might have a thickness of 1 cm and a width of 5 cm was pulled longitudinally until it was broken and the fracture was observed. The evaluation was made based on the following criteria:

⊚: the breakage of the material in the fracture was 75% or over.

○: the breakage of the material in the fracture was 65% or more but less than 75%.

Δ: the breakage of the material in the fracture was 40% or more but less than 60%.

x: the breakage of the material in the fracture was less than 40%.

(3) Secondary expansion

The state of the surface of the molded product was observed and the evaluation was made based on the following criteria:

⊚: there were no irregularities.

○: there were few irregularities.

Δ: there were irregularities partly.

x: there were irregularities throughout.

TABLE 1

|  | Resin A | Resin B | Resin C | Resin D | Resin E | Resin F |
|---|---|---|---|---|---|---|
| Base | LLDPE | LLDPE | LLDPE | LLDPE | LLDPE | LLDPE |
| Carbon number and content (mol %) of comonomer | $n$-$C_6$(1.7) | $n$-$C_4$(1.4) | $n$-$C_4$(3.9) | $n$-$C_4$(4.1) | $n$-$C_4$(1.8) | $n$-$C_4$(1.6) |
| Density (g/cm$^3$) | 0.928 | 0.924 | 0.925 | 0.926 | 0.925 | 0.925 |
| MI (g/10 min) | 1.9 | 1.1 | 1.3 | 2.2 | 1.1 | 1.0 |
| Melting point (°C.) | 122 | 117 | 123 | 123 | 122 | 123 |
| Quantity of heat absorbed $q_{total}$ when melted (J/g) | 137.6 | 90.9 | 105.2 | 110.4 | 104.7 | 102.5 |
| W (°C.) | 6.5 | 8.5 | 4.2 | 4.6 | 3.1 | 3.3 |
| $q_1/q_{total}$ | 0.55 | 0.52 | 0.53 | 0.52 | 0.53 | 0.40 |
| Name of product, manufacturer, etc. | custom-made | Idemitsu L0144 | custom-made | custom-made | NUC MF-J1993 | Sumitomo KG012 |

|  | Resin G | Resin H | Resin I | Resin J | Resin K | Resin L |
|---|---|---|---|---|---|---|
| Base | LLDPE | LLDPE | LLDPE | LLDPE | LLDPE | HDPE |
| Carbon number and content (mol %) of comonomer | $n$-$C_4$(2.3) | $n$-$C_8$(2.5) | $n$-$C_4$(1.0) | $n$-$C_4$(2.3) | $n$-$C_8$(2.0) | $n$-$C_3$(—) |
| Density (g/cm$^3$) | 0.920 | 0.916 | 0.926 | 0.920 | 0.939 | 0.965 |
| MI (g/10 min) | 1.1 | 2.1 | 1.1 | 1.0 | 2.0 | 1.9 |
| Melting point (°C.) | 122 | 122 | 119 | 122 | 129 | 135 |
| Quantity of heat absorbed $q_{total}$ when melted (J/g) | 77.2 | 79.6 | 111.1 | 120.8 | 194.2 | — |
| W (°C.) | 3.3 | 7.8 | 6.8 | 8.2 | 7.5 | — |
| $q_1/q_{total}$ | 0.63 | 0.67 | 0.46 | 0.57 | 0.27 | — |
| Name of product, manufacturer, etc. | NUC MF-J1602 | Idemitsu moatech | custom-made | Idemitsu 0134 | custom-made | Idemitsu F310 |

TABLE 2

|  | Example 1 | Example 2* | Example 3* | Comparative Example 1 |
|---|---|---|---|---|
| Base | Resin A | Resin A | Resin B | Resin C |
| Expanding agent and added | isobutane (80 g) and $CO_2$ (50 g) | $CO_2$ (100 g) | $CO_2$ (100 g) | isobutane (80 g) and $CO_2$ (50 g) |

TABLE 2-continued

| | | | | | | | | | | | | |
|---|---|---|---|---|---|---|---|---|---|---|---|---|
| amount (g) | | | | | | | | | | | | |
| Expanding temperature (°C.) | 119 | 120 | 121 | 122 | 123 | 124 | 116 | 117 | 118 | 119 | 120 | 121 |
| Expansion rate (times) | 29.8 | 37.9 | 42.4 | 12.5 | 16.8 | 17.3 | 8.4 | 10.9 | 12.2 | 4.2 | 4.1 | 5.1 |
| Quantity of heat absorbed on high-temperature side (J/g) | 38.3 | 26.5 | 16.2 | 35.2 | 28.9 | 19.9 | 23.6 | 17.6 | 13.1 | 31.6 | 28.4 | 12.1 |
| Dimensional accuracy | ⊙ | ⊙ | ⊙ | ⊙ | ⊙ | ⊙ | ⊙ | ⊙ | ○ | ⊙ | ⊙ | x |
| Fusion | ⊙ | ⊙ | ⊙ | ⊙ | ⊙ | ⊙ | ○ | ⊙ | ⊙ | x | ⊙ | ○ |
| Secondary expansion | ⊙ | ⊙ | ⊙ | ⊙ | ⊙ | ⊙ | ○ | ⊙ | ⊙ | x | ⊙ | ⊙ |

| | Comparative Example 2 | | | Comparative Example 3* | | | Comparative Example 4* | | | Comparative Example 5* | | |
|---|---|---|---|---|---|---|---|---|---|---|---|---|
| Base | Resin D | | | Resin E | | | Resin F | | | Resin G | | |
| Expanding agent and added amount (g) | isobutane (80 g) and CO$_2$ (50 g) | | | CO$_2$ (100 g) | | | CO$_2$ (100 g) | | | CO$_2$ (100 g) | | |
| Expanding temperature (°C.) | 119 | 120 | 121 | 121 | 122 | 123 | 122 | 123 | 124 | 120 | 121 | 122 |
| Expansion rate (times) | 4.2 | 5.5 | 4.0 | 4.4 | 7.9 | 10.6 | 36.9 | 19.3 | 1.6 | 22.8 | 12.3 | 6.7 |
| Quantity of heat absorbed on high-temperature side (J/g) | 36.2 | 24.7 | 4.1 | 33.4 | 20.3 | 6.6 | 6.8 | 7.3 | 8.2 | 11.6 | 16.5 | 17.4 |
| Dimensional accuracy | ⊙ | ⊙ | x | ⊙ | ⊙ | x | ⊙ | ○ | x | ⊙ | Δ | x |
| Fusion | x | ⊙ | ○ | x | ⊙ | ○ | x | ○ | Δ | Δ | ⊙ | ⊙ |
| Secondary expansion | x | x | ⊙ | x | Δ | ⊙ | x | Δ | ○ | Δ | ⊙ | ⊙ |

| | Comparative Example 6* | | Comparative Example 7* | | | Comparative Example 8 | | |
|---|---|---|---|---|---|---|---|---|
| Base | Resin H | | Resin I | | | Resin I | | |
| Expanding agent and added amount (g) | CO$_2$ (100 g) | | CO$_2$ (100 g) | | | CO$_2$ (100 g) | | |
| Expanding temperature (°C.) | 120 | 121 | 118 | 119 | 120 | 118 | 119 | 120 |
| Expansion rate (times) | 18.1 | 14.3 | 7.2 | 9.3 | 17.9 | 1.9 | 2.8 | 3.8 |
| Quantity of heat absorbed on high-temperature side (J/g) | 15.1 | 25.3 | 24.7 | 17.2 | 11.2 | 25.5 | 19.2 | 13.0 |
| Dimensional accuracy | x | x | ○ | ⊙ | Δ | ⊙ | ⊙ | Δ |
| Fusion | ○ | ○ | Δ | ⊙ | ⊙ | Δ | ⊙ | ⊙ |
| Secondary expansion | ○ | x | x | ○ | ⊙ | x | ○ | ⊙ |

*Discharge pipeline was heated at the time of expansion and discharge.

TABLE 3

|  | Resin Mixture a | Resin Mixture b | Resin Mixture c | Resin Mixture d | Resin Mixture e | Resin Mixture f |
|---|---|---|---|---|---|---|
| Base resin and amount (g) per 100 g of resin mixture | Resin I $_{(50)}$ Resin H $_{(40)}$ Resin L $_{(10)}$ | Resin I $_{(55)}$ Resin H $_{(40)}$ Resin L $_{(5)}$ | Resin I $_{(50)}$ Resin J $_{(40)}$ Resin L $_{(10)}$ | Resin I $_{(40)}$ Resin H $_{(40)}$ Resin L $_{(20)}$ | Resin I $_{(90)}$ Resin L $_{(10)}$ | Resin K $_{(40)}$ Resin H $_{(60)}$ |
| Density (g/cm$^3$) | 0.925 | 0.923 | 0.925 | 0.929 | 0.929 | 0.926 |
| MI (g/10 min) | 1.4 | 1.4 | 1.4 | 1.3 | 1.0 | 2.0 |
| Melting point (°C.) | 124.7 | 122.8 | 124.4 | 126.0 | 124.9 | 125.6 |
| Quantity of heat absorbed $q_{total}$ when melted (J/g) | 113.6 | 103.9 | 119.5 | 110.7 | 121.0 | 103.4 |
| W (°C.) | 5.8 | 6.5 | 5.8 | 4.6 | 5.1 | 4.2 |
| $q_1 q_{total}$ | 0.66 | 0.58 | 0.58 | 0.66 | 0.43 | 0.51 |

TABLE 4

|  | Example 4 | | | Example 5 | | | Example 6 | | | Comparative Example 9 | | |
|---|---|---|---|---|---|---|---|---|---|---|---|---|
| Base | Resin Mixture a | | | Resin Mixture b | | | Resin Mixture c | | | Resin Mixture d | | |
| Expanding agent and added amount (g) | isobutane (80 g) and CO$_2$ (50 g) | | | isobutane (80 g) and CO$_2$ (50 g) | | | isobutane (80 g) and CO$_2$ (50 g) | | | isobutane (80 g) and CO$_2$ (50 g) | | |
| Expanding temperature (°C.) | 120 | 121 | 122 | 118 | 119 | 120 | 120 | 121 | 122 | 122 | 123 | 124 |
| Expansion rate (times) | 14.4 | 19.3 | 14.3 | 11.4 | 18.6 | 24.3 | 13.3 | 19.4 | 15.2 | 11.7 | 17.3 | 6.8 |
| Quantity of heat absorbed on high-temperature side (J/g) | 27.3 | 16.4 | 12.1 | 19.9 | 16.5 | 10.9 | 31.0 | 24.8 | 17.6 | 41.0 | 23.4 | 9.2 |
| Dimensional accuracy | ⊙ | ⊙ | ⊙ | ⊙ | ⊙ | ⊙ | ⊙ | ⊙ | ⊙ | ⊙ | ⊙ | Δ |
| Fusion | ⊙ | ⊙ | ⊙ | ⊙ | ⊙ | ⊙ | ⊙ | ⊙ | ⊙ | x | ⊙ | ⊙ |
| Secondary expansion | ⊙ | ⊙ | ⊙ | ⊙ | ⊙ | ⊙ | ⊙ | ⊙ | ⊙ | Δ | Δ | ⊙ |

|  | Comparative Example 10 | | | Comparative Example 11 | | |
|---|---|---|---|---|---|---|
| Base | Resin D | | | Resin E | | |
| Expanding agent and added amount (g) | isobutane (80 g) and CO$_2$ (50 g) | | | isobutane (80 g) and CO$_2$ (50 g) | | |
| Expanding temperature (°C.) | 120 | 121 | 122 | 119 | 120 | 122 |
| Expansion rate (times) | 11.4 | 11.3 | 8.3 | 10.7 | 19.1 | 14.2 |
| Quantity of heat absorbed on high-temperature side (J/g) | 26.8 | 21.6 | 17.6 | 33.9 | 16.9 | 0.0 |
| Dimensional accuracy | ⊙ | ⊙ | ⊙ | ⊙ | ⊙ | x |
| Fusion | ⊙ | ⊙ | ⊙ | x | ⊙ | Δ |
| Secondary expansion | Δ | ⊙ | ⊙ | x | ⊙ | ⊙ |

TABLE 5

|  | Example 7* | | | Example 8 | | | Example 9** | | |
|---|---|---|---|---|---|---|---|---|---|
| Base | Resin Mixture a | | | Resin Mixture a | | | Resin Mixture a | | |
| Expanding agent and added amount (g) | CO$_2$ (100 g) | | | CO$_2$ (100 g) | | | CO$_2$ (100 g) | | |
| Expanding | 123 | 124 | 125 | 123 | 124 | 125 | 123 | 124 | 125 |

TABLE 5-continued

|  | Example 7* | | | Example 8 | | | Example 9** | | |
|---|---|---|---|---|---|---|---|---|---|
| temperature (°C.) | | | | | | | | | |
| Expansion rate (times) | 10.8 | 11.4 | 14.1 | 3.9 | 6.6 | 8.4 | 12.4 | 15.6 | 19.3 |
| Quantity of heat absorbed on high-temperature side (J/g) | 31.1 | 27.6 | 16.5 | 32.3 | 24.0 | 16.6 | 33.3 | 25.6 | 17.9 |
| Dimensional accuracy | ⊙ | ⊙ | ⊙ | ⊙ | ⊙ | ⊙ | ⊙ | ⊙ | ⊙ |
| Fusion | ⊙ | ⊙ | ⊙ | ⊙ | ⊙ | ⊙ | ⊙ | ⊙ | ⊙ |
| Secondary expansion | ⊙ | ⊙ | ⊙ | ⊙ | ⊙ | ⊙ | ⊙ | ⊙ | ⊙ |

*Discharge pipeline was heated at the time of expansion and discharge.
**Discharge pipeline was heated at the time of expansion and discharge. Borax was added to the resin particles.

As described above, since the present uncrosslinked polyethylene particles for the production of expanded particles have a density of over 0.920 g/cm$^3$ and up to and including 0.940 g/cm$^3$ and, in the DSC curve of the resin particles, there is such a relationship $q_1/q_{total} \geq 0.5$ and the temperature width at ½ of the height of the endothermic peak the temperature of the apex of which is 115° C. or over is 5° C. or more, expanded particles excellent in moldability and having a high expansion rate can be produced securely, and since the expanding efficiency is excellent, expanded particles having a high expansion rate can be obtained by using a smaller amount of an expanding agent, and therefore there is an effect enabling to reduce the amount of an expanding agent to be used.

Further, since expanded particles having a high expansion rate can be easily obtained even by using an inexpensive inorganic gas expanding agent such as carbon dioxide, expanding agents that are hitherto used and are likely to destroy the environment, such as halogenated hydrocarbons and other petroleum gases, can be replaced with the inorganic gas expanding agents, the cost of expanding agents can be reduced, and since equipments for recovering expanding agents and the operation for recovering expanding agents as in the case wherein expanding agents that are likely to destroy the environment are used are not required, the cost can be decreased considerably. The expanded particles obtained by using the present resin particles can produce a good molded product without applying a special internal pressure, a temperature range suitable for molding is widened, and in particular, molding at a low molding temperature in comparison with the prior art becomes possible. Thus, the secondary expansion and the fusion of the expanded particles becomes good, the moldability of the expanded particles is improved considerably, with the result that the molded product is prevented, for example, from shrinking thereby improving the dimensional accuracy, and further the cost of the production of the obtainable molded product can be drastically decreased, for example, because of a decrease in scrap of the molded product or a saving in energy for molding due to a low molding temperature.

We claim:

1. Uncrosslinked polyethylene resin particles for the production of expanded particles, comprising uncrosslinked polyethylene having a density of from over 0.920 g/cm$^3$ and up to and including 0.940 g/cm$^3$, and wherein when the DSC curve of said resin particles is obtained by using a differential scanning calorimeter in such a manner that after 1 to 10 mg of the resin particles is heated to 200° C. at 10° C./min and then is cooled to 40° C. at 10° C./min, heating is again carried out to 200° C. at 10° C./min and during the second heating the measurement for the DSC curve is carried out, $q_1/q_{total} \geq 0.5$, wherein $q_1$ stands for the quantity of heat absorbed in the range of the DSC curve of from 50° C. to (the melting point−10)° C. in terms of J/g and $q_{total}$ stands for the total quantity of absorbed heat of the DSC curve of from 50° C. to the temperature at which the melting is completed in terms of J/g, and in the DSC curve the temperature width at ½ of the peak height of the endothermic peak whose apex is located on the side of the temperature higher than 115° C. is at least 5° C.

2. The uncrosslinked polyethylene resin particles for the production of expanded particles as claimed in claim 1, wherein the uncrosslinked polyethylene is an uncrosslinked straight-chain low-density polyethylene.

3. The uncrosslinked polyethylene resin particles for the production of expanded particles as claimed in claim 1, wherein the uncrosslinked polyethylene is a mixture of at least two different uncrosslinked straight-chain low-density polyethylenes, the difference in the densities between at least two of said uncrosslinked straight-chain low-density polyethylenes is at least 0.005 g/cm$^3$, and the difference in the melting points between at least two of said uncrosslinked straight-chain low-density polyethylenes is 5° to 15° C.

4. The uncrosslinked polyethylene resin particles for the production of expanded particles as claimed in claim 1, wherein the uncrosslinked polyethylene is a mixture of an uncrosslinked straight-chain low-density polyethylene with an uncrosslinked high-density polyethylene having a density higher than that of said straight-chain low-density polyethylene by at least 0.02 g/cm$^3$ and a melting point higher than that of said straight-chain low-density polyethylene by 10° to 20° C.

5. Uncrosslinked polyethylene expanded particles, comprising expanded particles that are obtained by dispersing resin particles impregnated with an expanding agent into a dispersing medium in a closed vessel and releasing the resin particles and the dispersing medium from the closed vessel at the softening temperature of the resin particles or a temperature higher than that into a low-pressure region, wherein the base resin of the resin particles is an uncrosslinked polyethylene having a density of from over 0.920 g/cm$^3$ and up to and including 0.940 g/cm$^3$, and said resin particles comprise uncrosslinked polyethylene resin particles, wherein when the DSC curve of said resin particles is obtained by using a differential scanning calorimeter in such a manner that after 1 to 10 mg of the resin particles is heated to 200° C. at 10° C./min and then is cooled to 40° C. at 10° C./min, heating is again carried out to 200° C. at 10° C./min and during the second heating the measurement for the DSC curve is carried out, $q_1/q_{total} \geq 0.5$, wherein $q_1$ stands for the quantity of heat absorbed in the range of the DSC curve of from 50° C. to (the melting point−10)° C. in terms of J/g and $q_1$ stands for the total quantity of absorbed heat of the DSC curve of from 50° C. to the temperature at which the melting is completed in terms of J/g, and in the DSC curve the temperature width at ½ of the peak height of the endothermic peak whose apex is located on the side of the temperature higher than 115° C. is at least 5° C.

6. The uncrosslinked polyethylene expanded particles as claimed in claim 5, wherein the uncrosslinked polyethylene that is the base resin of the resin particles is an uncrosslinked straight-chain low-density polyethylene.

7. The uncrosslinked polyethylene expanded particles as claimed in claim 5, wherein the uncrosslinked polyethylene that is the base resin of the resin particles is a mixture of at least two different uncrosslinked straight-chain low-density polyethylenes, the difference in the densities between at least two of said uncrosslinked straight-chain low-density polyethylenes is at least 0.005 g/cm³, and the difference in the melting points between at least two of said uncrosslinked straight-chain low-density polyethylenes is 5° to 15° C.

8. The uncrosslinked polyethylene expanded particles as claimed in claim 5, wherein the uncrosslinked polyethylene that is the base resin of the resin particles is a mixture of at least one uncrosslinked straight-chain low-density polyethylene with at least one uncrosslinked high-density polyethylene having a density higher than that of said straight-chain low-density polyethylenes by at least 0.02 g/cm³ and a melting point higher than that of said straight-chain low-density polyethylene by 10° to 20° C.

9. The uncrosslinked polyethylene expanded particles as claimed in claim 5, wherein said expanding agent is an inorganic gas expanding agent and said resin particles are discharged from the closed vessel at an expanding temperature in the range of from (the melting point of the resin particles−10° C.) to (the melting point of the resin particles+ 5° C).

10. The uncrosslinked polyethylene expanded particles as claimed in claim 5, wherein said expanding agent is a mixture of an inorganic gas expanding agent and a volatile expanding agent and wherein said resin particles are discharged from the closed vessel at an expanding temperature in the range of from (the melting point of the resin particles− 10° C.) to (the melting point of the resin particles+ 10° C).

11. The uncrosslinked polyethylene particles of claim 1 wherein said uncrosslinked polyethylene has a melt index MI of from 0.1 g/10 min. to 5 g/10 min.

12. The uncrosslinked polyethylene particles of claim 11 wherein said uncrosslinked polyethylene has an MI of from 0.8 g/10 min. to 2.0 g/10 min. and a melting point of less than 120° C.

13. The uncrosslinked polyethylene particles of claim 2 wherein the straight-chain low-density polyethylene is a copolymer of ethylene and from 1 to 20 wt % α-olefin having 4 to 10 carbon atoms.

* * * * *